(12) United States Patent
Noyori et al.

(10) Patent No.: US 7,999,478 B2
(45) Date of Patent: Aug. 16, 2011

(54) VEHICLE HEADLIGHT DEVICE

(75) Inventors: Yasushi Noyori, Shizuoka (JP);
Takayoshi Kitagawa, Shizuoka (JP)

(73) Assignee: Koita Manufacturing Co., Ltd., Tokyo (JP)

( * ) Notice: Subject to any disclaimer, the term of this patent is extended or adjusted under 35 U.S.C. 154(b) by 527 days.

(21) Appl. No.: 12/105,135

(22) Filed: Apr. 17, 2008

(65) Prior Publication Data

US 2008/0259625 A1    Oct. 23, 2008

(30) Foreign Application Priority Data

Apr. 18, 2007    (JP) ................................. 2007-109677

(51) Int. Cl.
*B60Q 1/14* (2006.01)
(52) U.S. Cl. ............ 315/77; 315/82; 315/291; 307/10.8
(58) Field of Classification Search .................... 315/77, 315/82, 88, 291; 307/10.1, 10.8; 362/507, 362/512

See application file for complete search history.

(56) References Cited

U.S. PATENT DOCUMENTS

| | | | | |
|---|---|---|---|---|
| 4,213,075 A | * | 7/1980 | Ericson | 315/83 |
| 4,868,720 A | * | 9/1989 | Miyauchi et al. | 362/466 |
| 5,707,129 A | * | 1/1998 | Kobayashi | 362/464 |
| 5,912,534 A | * | 6/1999 | Benedict | 315/82 |
| 5,923,125 A | * | 7/1999 | Endo | 315/82 |
| 6,281,631 B1 | * | 8/2001 | Schaffer et al. | 315/82 |
| 6,936,969 B2 | * | 8/2005 | Gourdine | 315/82 |
| 2002/0154513 A1 | | 10/2002 | Yagi et al. | |
| 2003/0174448 A1 | * | 9/2003 | Kubota et al. | 361/23 |
| 2004/0217712 A1 | * | 11/2004 | Takeda et al. | 315/82 |
| 2004/0240221 A1 | * | 12/2004 | Choi | 362/510 |
| 2007/0114416 A1 | * | 5/2007 | Ohta et al. | 250/338.4 |
| 2007/0257272 A1 | * | 11/2007 | Hutchins | 257/98 |

FOREIGN PATENT DOCUMENTS

DE    43 41 058 C1    4/1995
JP    2002-316578    10/2002

OTHER PUBLICATIONS

Official Communication issued in German Application No. 10 2008 019 606.1-31 issued on Sep. 8, 2008 and English translation thereof, 8 pages.

* cited by examiner

*Primary Examiner* — Douglas W Owens
*Assistant Examiner* — Tung X Le
(74) *Attorney, Agent, or Firm* — Osha • Liang LLP

(57) ABSTRACT

A vehicle headlight device includes a lower beam unit for illuminating a lower beam, an upper beam/infrared ray switching unit for switching between illuminating an upper beam and an infrared ray, a low-beam abnormality detecting circuit for detecting an abnormality of the lower beam unit, a power-supply abnormality detecting circuit for detecting an abnormality of a power supply of the vehicle headlight, and a control circuit that inhibits the upper beam/infrared ray switching unit from illuminating the infrared ray when an abnormality is detected by either the low-beam abnormality detecting circuit or the power-supply abnormality detecting circuit.

8 Claims, 5 Drawing Sheets

VEHICLE HEADLIGHT DEVICE

BACKGROUND OF INVENTION

1. Field of the Invention

The present invention relates to a vehicle headlight device installed into a vehicle to illuminate a front area of the vehicle and, more particularly, a vehicle headlight device using a bulb for emitting visible light and a bulb for emitting an infrared ray as a light source.

2. Background Art

As the vehicle headlight device, for example, such a device has been proposed that the halogen lamp for emitting an upper beam of visible light is employed as the high-beam light source. An infrared ray forming globe for shielding the visible light and transmitting infrared rays only is arranged movably with respect to the high-beam light source. The use of the upper beam and the infrared ray is switched by selecting one of a mode in which the infrared ray forming globe covers the high-beam light source, and a mode in which the infrared ray forming globe is moved ahead of the high-beam light source and the situation located ahead of the vehicle is shot with a CCD ("charge coupled device") camera and displayed on a display (see Patent Literature 1).

According to the vehicle headlight device of this type, when the illumination light is switched from the upper beam to the infrared ray, the image picked up by the infrared ray CCD camera can be displayed on the display. Therefore, even when the front situation cannot be sufficiently grasped by the low-beam illumination, the situation in front of the vehicle can be sufficiently grasped from the image on the display.

[Patent Literature 1] JP-A-2002-316578 (see p. 3 to p. 5, FIG. 1 to FIG. 3)

SUMMARY OF INVENTION

However, in the prior art, when the abnormality such as disconnection, failure, or the like occurs in the low-beam lamp in a situation that the illumination light is switched from the upper beam to the infrared ray, the vehicle is able to run in a dead-dark condition in which no upper beam is illuminated, i.e., a condition that only the infrared ray is illuminated and the image picked up by the infrared ray CCD camera is displayed on the display. In this case, because the infrared ray is invisible to the human eye, it is feared that others will not be aware of the presence of the vehicle.

Also, even when the abnormality occurs in the battery voltage, the lamp lighting circuit does not stop the illumination of the infrared ray that is invisible to the human eye.

One or more embodiments of the present invention inhibit an infrared ray from being emitted in an abnormal situation of a power supply or a lower beam.

In a vehicle headlight device according to one or more embodiments includes a lower beam unit for illuminating a lower beam, an upper beam/infrared ray switching unit for switching an upper beam and an infrared ray to illuminate, and a control circuit for receiving a supply of a power from a power supply to operate, and controlling a switching of the upper beam/infrared ray switching unit, and also includes a low-beam abnormality detecting circuit for detecting an abnormality of the lower beam unit; a power-supply abnormality detecting circuit for detecting an abnormality of the power supply; and an infrared ray stop signal generating circuit for outputting an infrared ray stop signal to the control circuit based on an abnormal signal from the low-beam abnormality detecting circuit or an abnormal signal from the power-supply abnormality detecting circuit; wherein the control circuit inhibits the upper beam/infrared ray switching unit from illuminating the infrared ray in response to the infrared ray stop signal from the infrared ray stop signal generating circuit, and commands the upper beam/infrared ray switching unit to illuminate the upper beam or the infrared ray in other situations.

The control circuit commands the upper beam/infrared ray switching unit to illuminate the upper beam or the infrared ray when the lower beam and the power supply voltage are in their normal state, and also the control circuit inhibits the upper beam/infrared ray switching unit from illuminating the infrared ray in response to the infrared ray stop signal from the infrared ray stop signal generating circuit when the lower beam or the power supply voltage is brought into an abnormal state in a situation that the lower beam must be illuminated. Therefore, it can be prevented that only the infrared ray is emitted in a situation that the lower beam should be emitted and, thus, this device can contribute to improvement of safety in traveling.

In the vehicle headlight device according to one or more embodiments, the infrared ray stop signal generating circuit is constructed by two sets of electronic circuits each of which is formed of a transistor and resistors, outputs of both electronic circuits are connected to the control circuit as one added signal line, one electronic circuit outputs a first infrared ray stop signal in response to an abnormal signal from the low-beam abnormality detecting circuit, and other electronic circuit outputs a second infrared ray stop signal in response to an abnormal signal from the power-supply abnormality detecting circuit.

The infrared ray stop signal generating circuit is constructed by two sets of electronic circuits each of which is formed of a transistor and resistors, the first infrared ray stop signal as the output of one electronic circuit and the second infrared ray stop signal as the output of the other electronic circuit are output to the control circuit via one signal line respectively. Therefore, the first infrared ray stop signal and the second infrared ray stop signal can be transmitted with a simple electronic circuit via one signal line and, thus, a simplification of the circuit configuration can be attained.

In the vehicle headlight device according to one or more embodiments, the lower beam unit has a light emitting diode for emitting the lower beam and a lower beam lighting circuit for lighting the light emitting diode, and the lower beam lighting circuit, the low-beam abnormality detecting circuit, and the power-supply abnormality detecting circuit are constructed integrally.

The lower beam lighting circuit, the low-beam abnormality detecting circuit, and the power-supply abnormality detecting circuit are constructed integrally to lighten the lower beam or to detect the abnormality of the power supply or the lower beam. Therefore, there is no need to provide additional circuit units and, thus, assembling of the vehicle headlight device can be facilitated.

As apparent from the above explanation, according to the vehicle headlight device according to one or more embodiments, it can be prevented that only the infrared ray is emitted in a situation that the lower beam should be emitted and, thus, this device can contribute to improvement of safety in traveling.

According to one or more embodiments, a simplification of the circuit configuration can be attained.

According to one or more embodiments, there is no need to provide additional circuit units and, thus, assembling of the vehicle headlight device can be made easily.

Other aspects and advantages of the invention will be apparent from the following description, the drawings and the claims.

DETAILED DESCRIPTION

Figure 1:
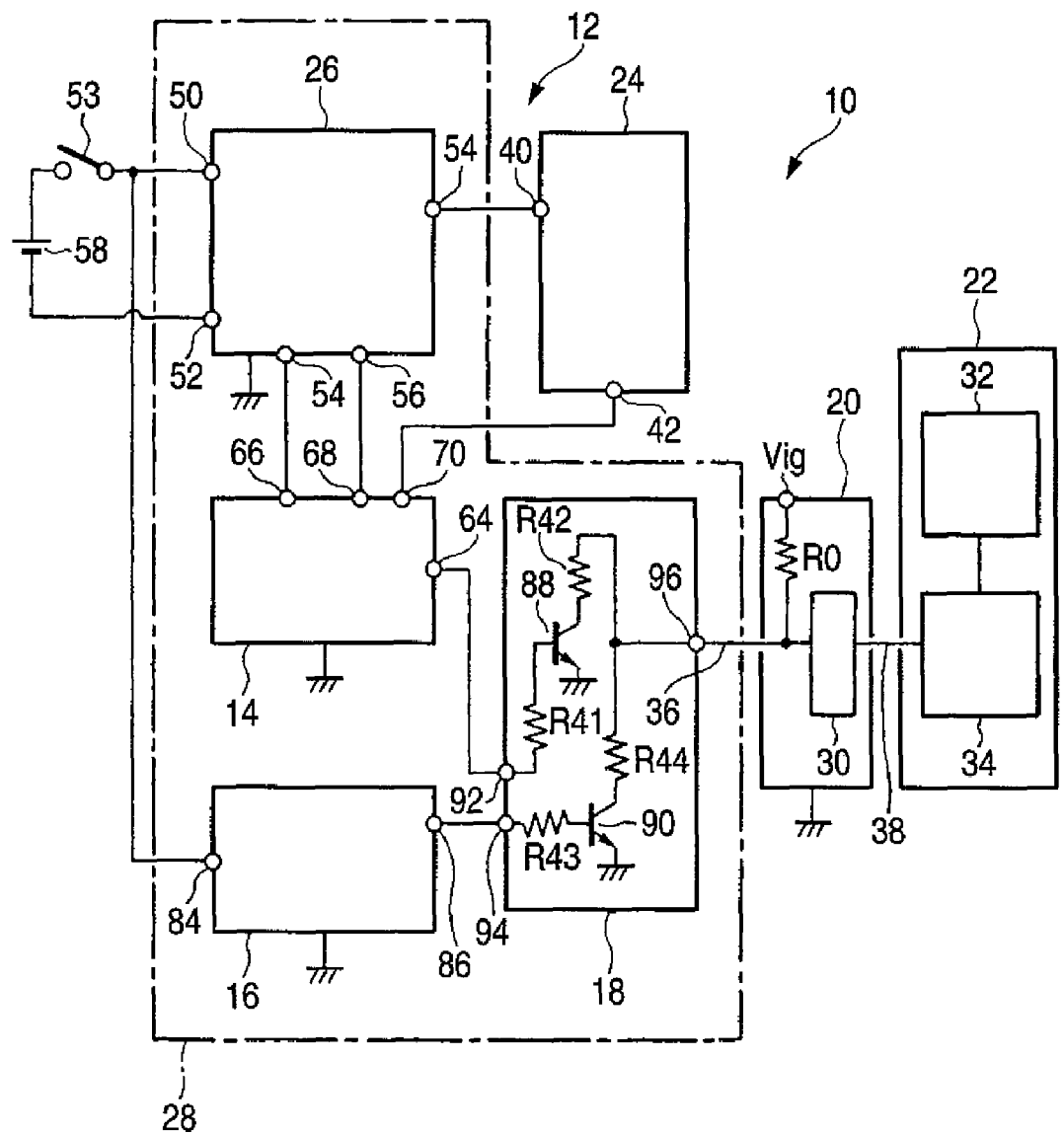
FIG. 1 is a configurative block diagram of a vehicle headlight device showing an embodiment of the present invention.
Figure 3:
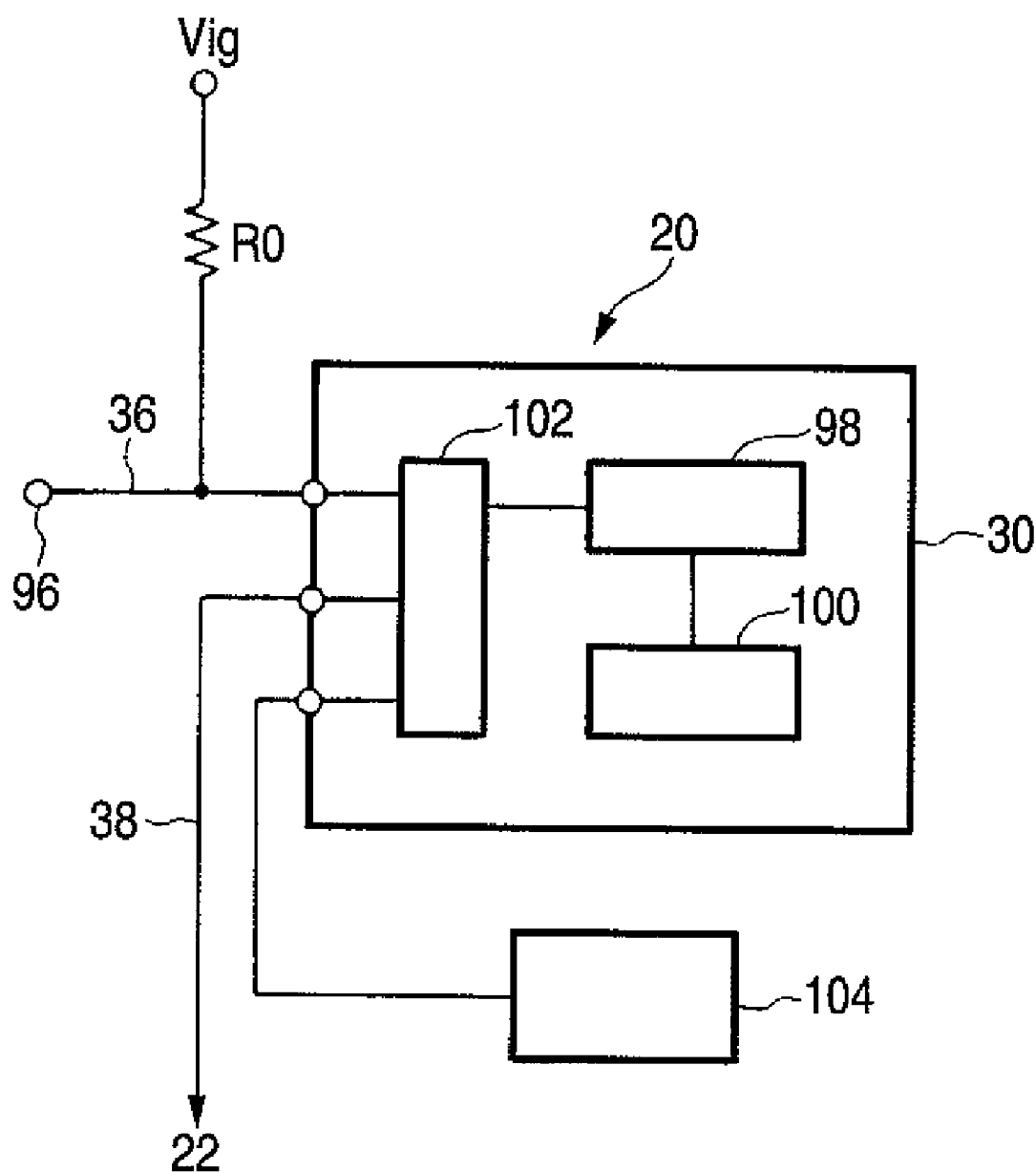
FIG. 3 is a configurative block diagram of a control circuit.
Figure 4:
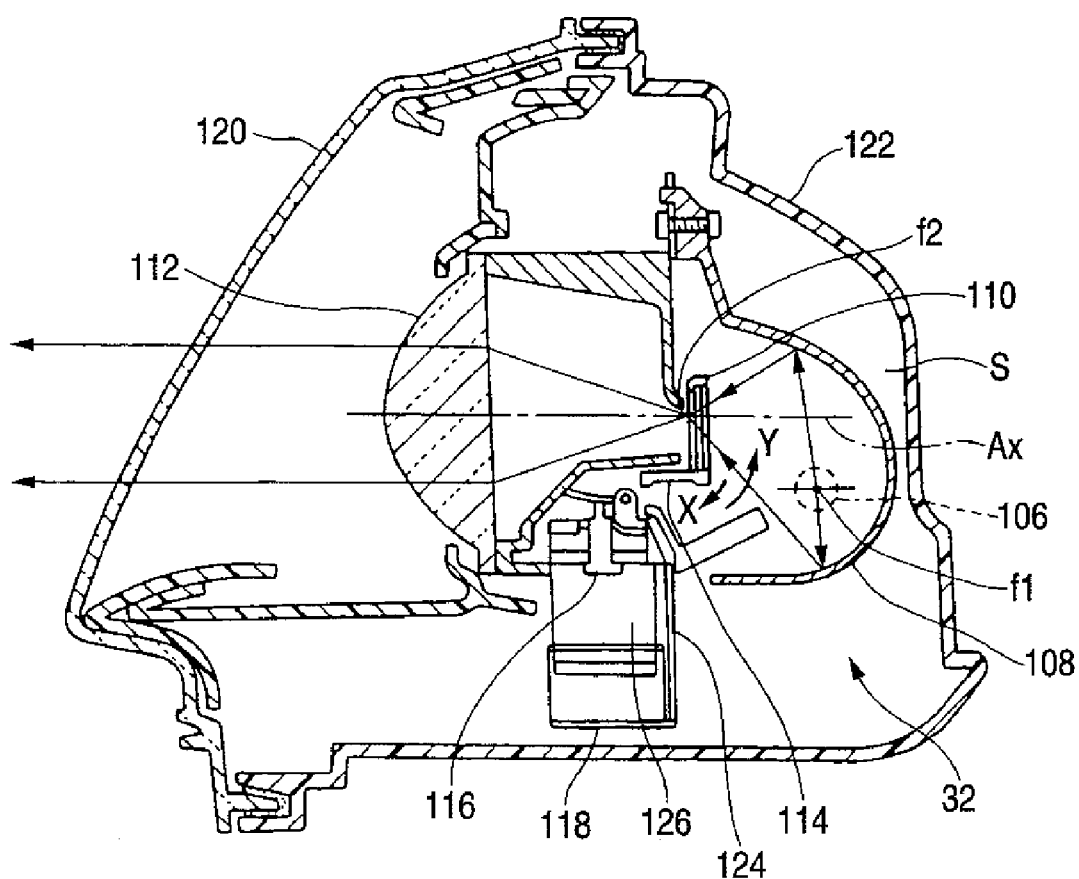
FIG. 4 is a sectional view of an upper beam/infrared ray light source unit.
Figure 5:
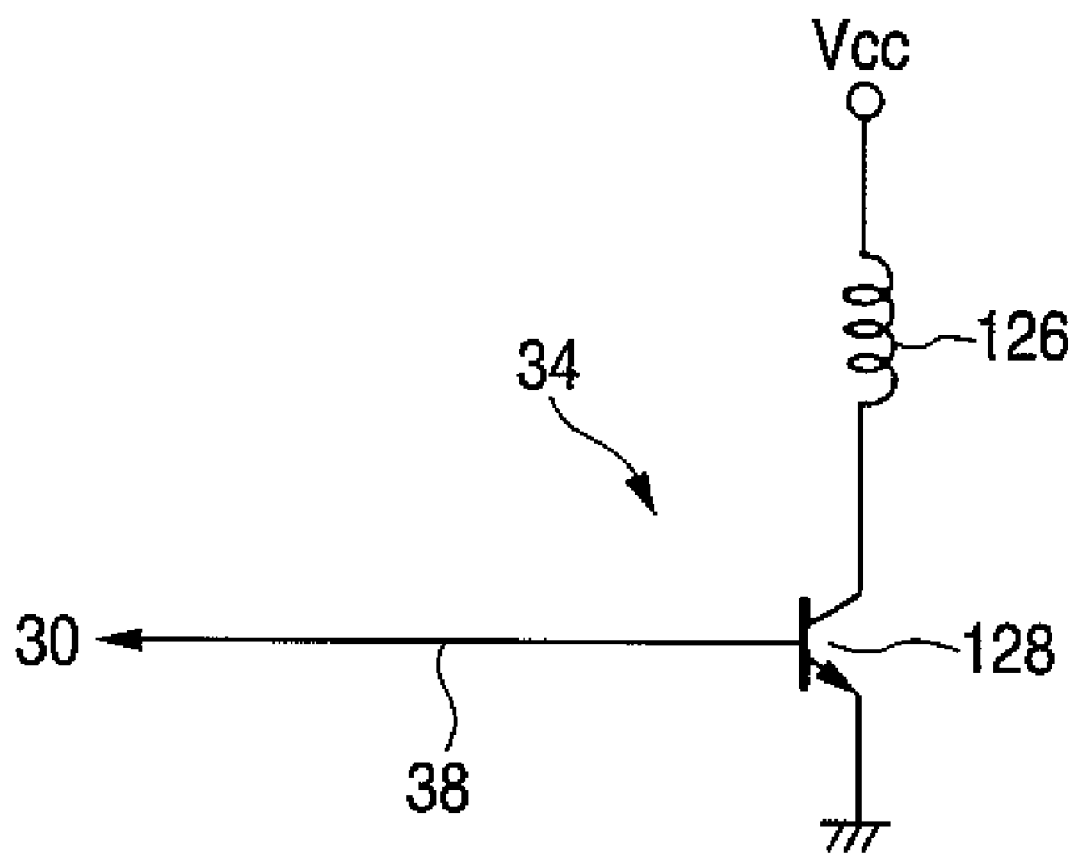
FIG. 5 is a configurative circuit diagram of an infrared ray transmission filter driving circuit.

Embodiments of the present invention will be explained with reference to the drawings hereinafter. FIG. 1 is a configurative block diagram of a vehicle headlight device showing an embodiment of the present invention, FIG. 2 is a pertinent configurative circuit diagram of the vehicle headlight device, FIG. 3 is a configurative block diagram of a control circuit, FIG. 4 is a sectional view of an upper beam/infrared ray light source unit, and FIG. 5 is a configurative circuit diagram of an infrared ray transmission filter driving circuit.

In FIG. 1, a vehicle headlight device 10 is constructed to have a lower beam unit 12, a low-beam abnormality detecting circuit 14, a power-supply abnormality detecting circuit 16, an infrared ray stop signal generating circuit 18, a control unit 20, and an upper beam/infrared ray switching unit 22.

The lower beam unit 12 is constructed by a low-beam light source block 24, and a lower beam lighting circuit 26. The lower beam lighting circuit 26 is provided integrally with the low-beam abnormality detecting circuit 14, the power-supply abnormality detecting circuit 16, and the infrared ray stop signal generating circuit 18, and is installed into a driver module 28. The control unit 20 is constructed to have a resistor R0 and a control circuit 30. The upper beam/infrared ray switching unit 22 is constructed to have an upper beam/infrared ray light source unit 32 and an infrared ray transmission filter driving circuit 34. An input side of the control circuit 30 is connected to the infrared my stop signal generating circuit 18 via an intermediate voltage signal line 36 and also is connected to a power supply via the resistor R0 and an ignition switch (not shown), and an output side is connected to the infrared ray transmission filter driving circuit 34 via a control signal line 38.

Figure 2:
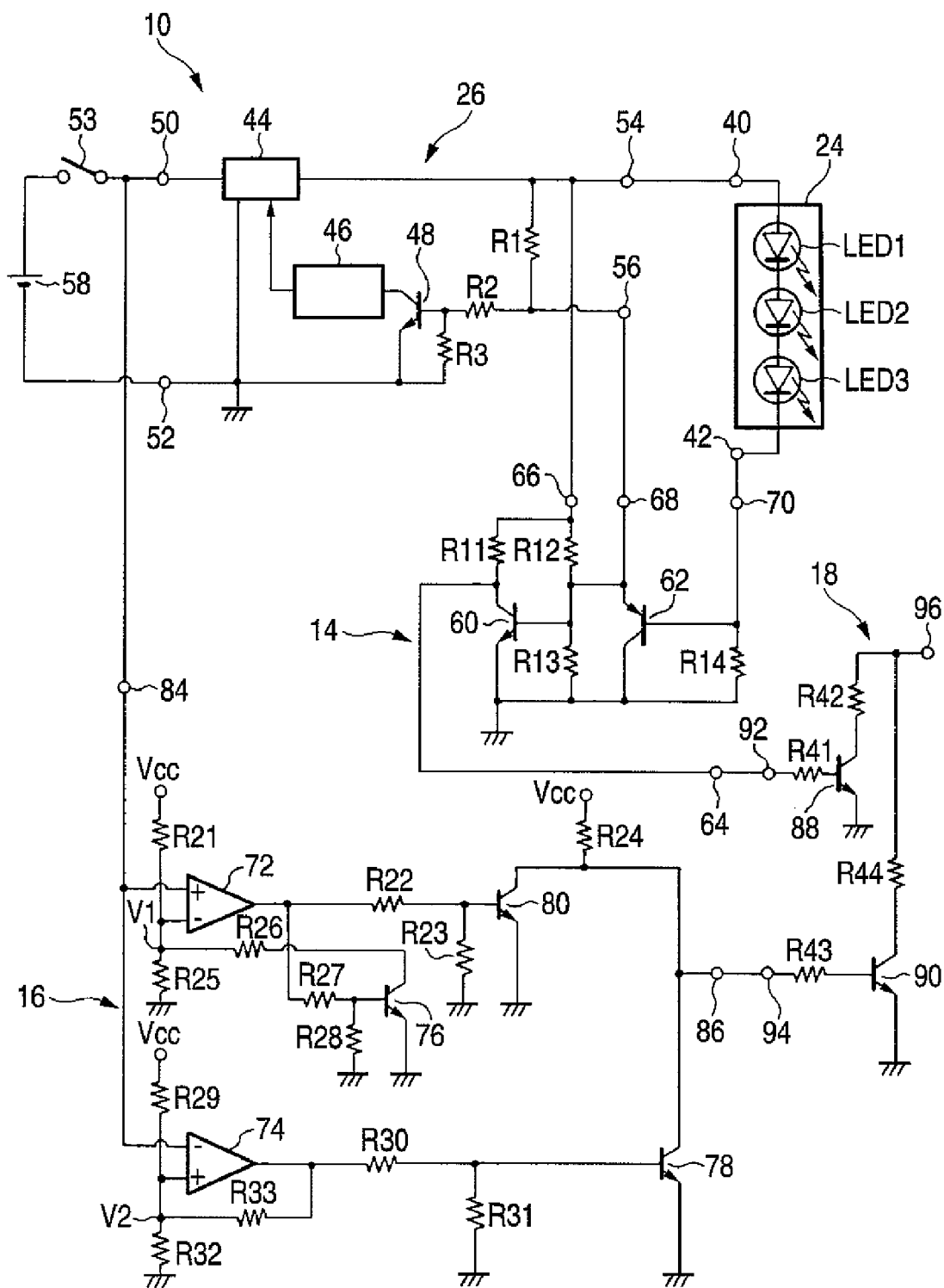
FIG. 2 is a configurative circuit diagram of the vehicle headlight device.

As shown in FIG. 2, for example, the low-beam light source block 24 has light emitting diodes LED1, LED2, LED3 connected in series mutually, as a semiconductor light source that illuminates the lower beam. An anode of the light emitting diode LED1 is connected to the lower beam lighting circuit 26 via a terminal 40, and a cathode of the light emitting diode LED3 is connected to the low-beam abnormality detecting circuit 14 via a terminal 42.

The lower beam lighting circuit 26 has a relay 44, a relay controlling portion 46, an NPN transistor 48, and resistors R1, R2, R3 to control the lighting of the light emitting diodes LED1, LED2, LED3. An input side of the relay 44 is connected to an input terminal 50 and a ground side is grounded and connected to an input terminal 52, a control input side of the relay 44 is connected to the relay controlling portion 46, and an input side is connected to an output terminal 54. The input terminal 50 is connected to a positive terminal of a battery (DC power supply) 58 via a switch 53, and the input terminal 52 is connected to a negative terminal of the battery 58 and also is grounded. The output terminal 54 is connected to the terminal 40 of the low-beam light source block 24, and an abnormal signal input terminal 56 is connected to the low-beam abnormality detecting circuit 14.

In a condition that power is supplied from the battery 58, the relay 44 supplies power from the battery 58 to the low-beam light source block 24 via the output terminal 54 to turn ON the light emitting diodes LED1, LED2, LED3 when an ON control signal is not supplied from the relay controlling portion 46. However, relay controlling portion 46 cuts off power from the battery 58 to turn OFF the light emitting diodes LED1, LED2, LED3 when the ON control signal is supplied from the relay controlling portion 46. When the abnormal signal is not input from the low-beam abnormality detecting circuit 14 to the abnormal signal input terminal 56 (i.e., when the abnormal signal input terminal 56 is at a high level), the NPN transistor 48 is turned ON and a collector of the NPN transistor 48 is grounded, and thus the relay controlling portion 46 inhibits the outputting of the ON control signal. In contrast when the abnormal signal is input from the low-beam abnormality detecting circuit 14 to the abnormal signal input terminal 56 (i.e., when a level of the abnormal signal input terminal 56 is inverted from a high level to a low level), the NPN transistor 48 is turned OFF and the collector of the NPN transistor 48 goes to a high level, and thus the relay controlling portion 46 outputs the ON control signal.

In other words, the lower beam lighting circuit 26 supplies power from the battery 58 to the low-beam light source block 24 via the output terminal 54 to turn ON the light emitting diodes LED1, LED2, LED3 in a normal condition of the low-beam light source block 24, and cuts off a power from the battery 58 to turn OFF the light emitting diodes LED1, LED2, LED3 in an abnormal condition of the low-beam light source block 24 (i.e., an abnormal condition of the lower beam).

In this case, as the relay controlling portion 46, such a configuration may be employed that the ON control signal is output intermittently to the relay 44 when the abnormal signal is not input from the low-beam abnormality detecting circuit 14 to the abnormal signal input terminal 56, and thus the light emitting diodes LED1, LED2, LED3 are flashed by the intermittent supply of power from the battery 58 to the low-beam light source block 24.

Also, as the lower beam lighting circuit 26, a switching regulator constituting a DC/DC converter can be employed. Also, the low-beam light source block 24 is not limited to a single block, and a plurality of parallel-connected blocks can be employed as the light source block. The light emitting diodes LED1, LED2, LED3 can be used as a light source for various vehicle lighting devices such as a head lamp, a stop and tail lamp, a fog lamp, a turn signal lamp, and the like.

The low-beam abnormality detecting circuit 14 is constructed to have an NPN transistor 60, a PNP transistor 62, and resistors R11, R12, R13, R14. An emitter of the NPN transistor 60 is grounded, and a collector is connected to the infrared ray stop signal generating circuit 18 via an output terminal 64. A connection point between the resistors R11 and R12 is connected to the output terminal 54 of the lower beam lighting circuit 26 via a power supply terminal 66. A collector of the PNP transistor 62 is grounded, an emitter is connected to the abnormal signal input terminal 56 of the lower beam lighting circuit 26 via an abnormal signal output terminal 68, and a base is connected to the terminal 42 of the low-beam light source block 24 via an input terminal 70.

In the low-beam abnormality detecting circuit 14, when the low-beam light source block 24 is in a normal condition (i.e., when the lower beam is in a normal condition), a normal current flows through the resistor R14, the PNP transistor 62 is in an OFF state, and the NPN transistor 60 is in an ON state. Therefore, the low-beam abnormality detecting circuit 14 holds a level of the abnormal signal output terminal 68 at a high level (H) and holds a level of the output terminal 64 at a low level (L).

In contrast, when the low-beam light source block 24 is in an abnormal condition (i.e., when the lower beam is in an abnormal condition), e.g., when a disconnection occurs in either of the light emitting diodes LED1, LED2, LED3, a normal current does not flow through the resistor R14, the PNP transistor 62 is shifted from an OFF state to an ON state, and the NPN transistor 60 is shifted from an ON state to an OFF state. Therefore, the low-beam abnormality detecting circuit 14 inverts a level of the abnormal signal output terminal 68 from a high level (H) to a low level (L) and also inverts a level of the output terminal 64 from a low level (L) to a high level (H). As a result, an abnormal signal (a first abnormal signal) indicating that an abnormality occurs in the lower beam is output to the lower beam lighting circuit 26 and the infrared ray stop signal generating circuit 18.

The power-supply abnormality detecting circuit 16 is constructed to have OP amplifiers 72, 74, NPN transistors 76, 78, 80, and resistors R21 to R33. A positive input terminal of the OP amplifier 72 and a negative input terminal of the OP amplifier 74 are connected to the input terminal 50 of the lower beam lighting circuit 26 via an input terminal 84. Respective collectors of the NPN transistors 80, 78 are connected to the infrared ray stop signal generating circuit 18 via an output terminal 86.

The OP amplifier 72 compares a power supply voltage applied to a positive input terminal (i.e., an output voltage of the battery 58) and an upper limit power supply voltage (i.e., a voltage obtained by dividing a voltage Vcc by the resistor R21 and the resistor R25) V1 applied to a negative input terminal. The OP amplifier 72 outputs a voltage at a low level (L) when the power supply voltage is less than the upper limit power supply voltage V1, and outputs a voltage at a high level (H) when the power supply voltage exceeds the upper limit power supply voltage V1. Both the NPN transistors 76, 80 are turned OFF when the voltage at a low level (L) is output from the OP amplifier 72, and both the NPN transistors 76, 80 are turned ON when the voltage at a high level (H) is output from the OP amplifier 72.

When the power supply voltage exceeds the upper limit power supply voltage V1 and the NPN transistor 80 is turned ON, the output terminal 86 is grounded and a signal at a low level (L) is output from the output terminal 86 as the abnormal signal indicating an abnormality of a power supply. At this time, the NPN transistor 76 is turned ON and then a voltage V11 that is lower than the upper limit power supply voltage V1 is applied to a negative input terminal of the OP amplifier 72 as a hysteresis. Therefore, when the power supply voltage exceeds the upper limit power supply voltage V1, the output of the OP amplifier 72 is held at a high level (H) until the power supply voltage is decreased lower than the voltage V11. Then, as soon as the power supply voltage is decreased lower than the voltage V11, the output of the OP amplifier 72 returns to a low level (L) from a high level (H).

In contrast, the OP amplifier 74 compares the power supply (i.e., the output voltage of the battery 58) applied to a negative input terminal and a lower limit power supply voltage (i.e., a voltage obtained by dividing the voltage Vcc by the resistor R29 and the resistor R32) V2 applied to a positive input terminal. The OP amplifier 74 outputs a voltage at a low level (L) when the power supply voltage is more than the lower limit power supply voltage V2, and outputs a voltage at a high level (H) when the power supply voltage is less than the lower limit power supply voltage V2. The NPN transistor 78 is turned OFF when the voltage at a low level (L) is output from the OP amplifier 74, and the NPN transistor 78 is turned ON when the voltage at a high level (H) is output from the OP amplifier 74.

When the power supply voltage is decreased lower than the lower limit power supply voltage V2 and the NPN transistor 78 is turned ON, the output terminal 86 is grounded and a signal at a low level (L) is output from the output terminal 86 as the abnormal signal indicating an abnormality of a power supply. At this time, the NPN transistor 78 is turned ON and then a voltage V22 that is higher than the lower limit power supply voltage V2 is applied to a positive input terminal of the OP amplifier 74 as a hysteresis. Therefore, when the power supply voltage is decreased lower than the lower limit power supply voltage V2, the output of the OP amplifier 74 is held at a high level (H) until the power supply voltage is raised higher than the voltage V22. Then, as soon as the power supply voltage is raised higher than the voltage V22, the output of the OP amplifier 74 returns to a low level (L) from a high level (H).

That is, when the power supply voltage is out of a range between the upper limit power supply voltage V1 and the lower limit power supply voltage V2, the power-supply abnormality detecting circuit 16 decides that the abnormality occurs in the battery 58 and then outputs the signal at a low level (L) as an abnormal signal indicating an abnormality of the power supply (a second abnormal signal).

The infrared ray stop signal generating circuit 18 is constructed to have NPN transistors 88, 90, and resistors R41, R42, R43, R44. An emitter of the NPN transistor 88 is grounded, a base is connected to an input terminal 92 via the resistor R41, and a collector is connected to an output terminal 96 via the resistor R42. An emitter of the NPN transistor 90 is grounded, a base is connected to an input terminal 94 via the resistor R43, and a collector is connected to the output terminal 96 via the resistor R44. The input terminal 92 is connected to the output terminal 64 of the low-beam abnormality detecting circuit 14, the input terminal 94 is connected to the output terminal 86 of the power-supply abnormality detecting circuit 16, and the output terminal 96 is connected to the control circuit 30 via the intermediate voltage signal line 36.

When the lower beam is in a normal state and the voltage at a low level (L) is applied to the input terminal 92, the NPN transistor 88 is held in an OFF state. At this time, when the power supply voltage is normal, the NPN transistor 90 is in an ON state and one end side of the resistor R44 is grounded. Therefore, a voltage of the output terminal 96 is decreased to an intermediate voltage (Vig/2) that is obtained by dividing a voltage Vig applied to the ignition switch by the resistor R0 and the resistor R44 of the control unit 20. As a result, the intermediate voltage (Vig/2) is output to the intermediate voltage signal line 36 from the output terminal 96 as a signal indicating the normal state.

In contrast, when the lower beam is in an abnormal state and the voltage at a high level (H) is applied to the input terminal 92, the NPN transistor 88 is turned ON. At this time, when the power supply voltage is normal (the NPN transistor 90 is in an ON state), the NPN transistor 88 is turned ON and one end side of the resistor R42 is grounded. Therefore, a voltage of the output terminal 96 is decreased lower than the intermediate voltage (Vig/2). As a result a voltage lower than the intermediate voltage (Vig/2) is output to the intermediate voltage signal line 36 from the output terminal 96 as an infrared ray stop signal (a first infrared ray stop signal).

When the power supply voltage is in a normal state and the voltage at a high level (H) is applied to the input terminal 94, the NPN transistor 90 responding to whether or not the abnormality of the power supply voltage occurs is kept in an ON state. At this time, the NPN transistor 90 is in an ON state and one end side of the resistor R44 is grounded. Therefore, a voltage of the output terminal 96 becomes equal to the intermediate voltage (Vig/2) that is obtained by dividing the voltage Vig applied to the ignition switch by the resistor R0 and the resistor R44 of the control unit 20. As a result, the intermediate voltage (Vig/2) is output to the intermediate voltage signal line 36 from the output terminal 96 as a signal indicating the normal state.

In contrast, when the power supply voltage becomes an abnormal state and the voltage at a low level (L) is applied to the input terminal 94, the NPN transistor 90 is turned OFF. At this time, when the NPN transistor 90 is turned OFF, the grounding of one end side of the resistor R44 is released. Therefore, a voltage of the output terminal 96 is raised up to the voltage Vig that is applied to the ignition switch. As a result, a voltage higher than the intermediate voltage (Vig/2) and applied to the ignition switch is output to the intermediate voltage signal line 36 from the output terminal 96 as an infrared ray stop signal (a second infrared ray stop signal).

In other words, the infrared ray stop signal generating circuit 18 includes a first electronic circuit (the NPN transistor 88, the resistors R41, R42) that responds to the abnormal signal from the low-beam abnormality detecting circuit 14 (the first abnormal signal) to output the first infrared ray stop signal, and a second electronic circuit (the NPN transistor 90, the resistors R43, R44) that responds to the abnormal signal from the power-supply abnormality detecting circuit 16 (the second abnormal signal) to output the second infrared ray stop signal, and respective outputs of the first and second electronic circuits are connected to the control circuit 30 as one added intermediate voltage signal line 36. When the abnormality is caused in either of the lower beam and the power supply voltage, the infrared ray stop signal generating circuit 18 outputs either the infrared ray stop signal whose level is lower than the intermediate voltage (Vig/2) (the first infrared ray stop signal) or the infrared ray stop signal whose level is higher than the intermediate voltage (Vig/2) (the second infrared ray stop signal) to the control circuit 30 from the output terminal 96 via the intermediate voltage signal line 36.

In this case, the voltage that becomes equal to Vig/2 when the voltage Vig applied to the ignition switch is divided by the resistor R0 and the resistor R44 of the control unit 20 is given only when R0=R44. Also, a resistance value of the resistor R42 is sufficiently small in contrast to a resistance value of the resistor R27.

As shown in FIG. 3, the control circuit 30 includes a CPU (Central Processing Unit) 98, a memory (ROM) 100, and an input/output interface 102. The CPU 98 is connected to the intermediate voltage signal line 36, the control signal line 38, and an upper beam/infrared ray switching switch 104 via the input/output interface 102. The CPU 98 discriminates a voltage level of the intermediate voltage signal line 36. When the voltage of the intermediate voltage signal line 36 is equal to the intermediate voltage (Vig/2) that is half of the voltage Vig applied to the ignition switch, the CPU 98 decides that the lower beam and the power supply voltage are in their normal state, and outputs the control signal responding to the switching signal fed from the upper beam/infrared ray switching switch 104 to the control signal line 38.

For example, when the switching signal used to illuminate the upper beam is output from the upper beam/infrared ray switching switch 104, the CPU 98 outputs the control signal used to illuminate the upper beam to the control signal line 38. Also, when the switching signal used to illuminate the infrared ray is output from the upper beam/infrared ray switching switch 104, the CPU 98 outputs the control signal used to illuminate the infrared ray to the control signal line 38.

In contrast, when the infrared ray stop signal is input from the intermediate voltage signal line 36 due to the abnormality of the lower beam or the power supply voltage even while the switching signal used to illuminate the infrared ray is output from the upper beam/infrared ray switching switch 104, the voltage on the intermediate voltage signal line 36 is decreased lower than the intermediate voltage (Vig/2) or is raised higher than the intermediate voltage (Vig/2). At that time, the CPU 98 outputs the control signal used to forcedly inhibit the illumination of the infrared ray to the control signal line 38.

In other words, the control circuit 30 discriminates a level of the voltage of the intermediate voltage signal line 36. When the voltage of the intermediate voltage signal line 36 is equal to the intermediate voltage (Vig/2) that is half of the voltage Vig applied to the ignition switch, the control circuit 30 decides that the lower beam and the power supply voltage are in their normal condition and outputs the control signal responding to the switching signal from the upper beam/infrared ray switching switch 104, for example, the control signal at a low level (L) when the upper beam is illuminated or the control signal at a high level (H) when the infrared ray is illuminated, to the upper beam/infrared ray switching unit 22 via the control signal line 38. As a result the control circuit 30 commands the upper beam/infrared ray switching unit 22 to forcedly inhibit the illumination of the upper beam or the infrared ray.

Also, when the voltage of the intermediate voltage signal line 36 is decreased lower than the intermediate voltage (Vig/2) or is raised higher than the intermediate voltage (Vig/2) and thus the infrared ray stop signal is input, the control circuit 30 decides that the lower beam or the power supply voltage is in an abnormal state, and outputs the control signal used to inhibit forcedly the illumination of the infrared ray, for example, the control signal at a low level (L), to the upper beam/infrared ray switching unit 22 via the control signal line 38. As a result the control circuit 30 commands the upper beam/infrared ray switching unit 22 to forcedly inhibit the illumination of the infrared ray.

The upper beam/infrared ray switching unit 22 has the upper beam/infrared ray light source unit 32 and the infrared ray transmission filter driving circuit 34. As shown in FIG. 4, the upper beam/infrared ray light source unit 32 has a light source bulb 106, a reflector 108, an infrared ray transmission filter 110, a convex lens 112, a bracket 114, a moving shaft 116, a filter driving unit 118, and the like, and is housed in a light chamber S that is enclosed with a front lens 120 and a lamp body 122.

The light source bulb 106 is arranged in a position of a first focal point f1 of the reflector 108, and illuminates the visible light acting as the upper beam. The infrared ray transmission filter 110 for reflecting the visible light and transmitting the infrared ray is arranged turnably in a position of a second focal point f2 of the reflector 108. The infrared ray transmission filter 110 is fixed to the bracket 114, and the bracket 114 is coupled rotatably to a rotating shaft (not shown) fixed to the filter driving unit 118. The bracket 114 is rotated clockwise or anticlockwise on the rotating shaft in response to a position of the moving shaft 116, which is arranged vertically movably in the filter driving unit 118, such that the infrared ray transmission filter 110 is arranged on an optical axis Ax or off of the optical axis Ax.

More specifically, when an exciting coil 126 housed in an exciting coil main body 124 of the filter driving unit 118 is in an unexcited state and the moving shaft 116 is protruded upwardly from the filter driving unit 118, the bracket 114 is rotated clockwise (an arrow X direction) and the infrared ray transmission filter 110 is arranged in a position off of the optical axis Ax and the propagation area of the visible light. At this time, the visible light emitted from the light source bulb 106 is reflected by the reflector 108, and then this reflected light passes through the second focal point f2 of the reflector 108 because this light is not shielded with the infrared ray transmission filter 110. Then, this reflected light is passed through the convex lens 112 and the front lens 120, and is illuminated obliquely ahead of the vehicle as the upper beam.

In contrast, when the exciting coil 126 is in an excited state and the moving shaft 116 is moved downwardly by a magnetic attracting force of the exciting coil 126, the bracket 114 is rotated anticlockwise (an arrow Y direction) and the infrared ray transmission filter 110 is arranged on the optical axis Ax. At this time, the visible light emitted from the light source bulb 106 is reflected by the reflector 108, and then the visible light out of this reflected light is shielded with the infrared ray transmission filter 110 and only the infrared ray passes through the second focal point f2 of the reflector 108. Then, this infrared ray is passed through the convex lens 112 and the front lens 120, and is illuminated obliquely ahead of the vehicle as the upper beam.

As shown in FIG. 5, the infrared ray transmission filter driving circuit 34 is constructed to have the exciting coil 126, and an NPN transistor 128 for driving the exciting coil 126, and a base of the NPN transistor 128 is connected to the control signal line 38. The NPN transistor 128 is turned ON to excite the exciting coil 126 when the control signal at a high level (H) is input from the control signal line 38, and is turned OFF to bring the exciting coil 126 into an unexcited state when the control signal at a low level (L) is input from the control signal line 38.

In other words, the upper beam/infrared ray switching unit 22 is operated based on the switching signal from the upper beam/infrared ray switching switch 104 in a condition that the lower beam and the power supply voltage are in their normal condition. The upper beam/infrared ray switching unit 22 illuminates the infrared ray obliquely ahead of the vehicle according to the excitation of the exciting coil 126 when the control signal at a high level (H) is input from the control circuit 30, and illuminates the upper beam obliquely ahead of the vehicle according to the non-excitation of the exciting coil 126 when the control signal at a low level (L) is input from the control circuit 30.

In contrast, even though the upper beam/infrared ray switching unit 22 must emit the infrared ray because the switching signal for illuminating the infrared ray is output from the upper beam/infrared ray switching switch 104 in a situation that the lower beam is not illuminated, the upper beam/infrared ray switching unit 22 stops forcedly the illumination of the infrared ray according to the non-excitation of the exciting coil 126 when the control signal at a low level (L) is input from the control circuit 30 because the lower beam or the power supply voltage is brought into an abnormal state. At this time, because the exciting coil 126 is brought into an unexcited state, the bracket 114 is rotated clockwise (an arrow X direction), the infrared ray transmission filter 110 is arranged in a position out of the optical axis Ax and the propagation area of the visible light and the upper beam is emitted from the upper beam/infrared ray switching unit 22.

According to one or more embodiments, the infrared ray or the upper beam is illuminated obliquely ahead of the vehicle in accordance with the switching signal fed from the upper beam/infrared ray switching switch 104 when the lower beam and the power supply voltage are in their normal state. However, the illumination of the infrared ray is stopped forcedly when the lower beam or the power supply voltage is brought into an abnormal state in a situation that the infrared ray is to be illuminated while the lower beam is illuminated, and the upper beam is illuminated obliquely ahead of the vehicle instead of the infrared ray. As a result, it can be prevented that only the infrared ray is emitted in a situation that the lower beam should be emitted and, thus, this device can contribute to improvement of safety in traveling.

Also, when the lower beam or the power supply voltage is brought into an abnormal state in a situation that the lower beam is illuminated and thus the illumination of the infrared ray is stopped forcedly, the image picked up by the infrared ray CCD camera is not displayed on the display. As a result, not only is the driver unable to drive the vehicle by looking at the image picked up by the infrared ray CCD camera, but also, the driver is informed of the effect indicating that the abnormality occurs.

Also, according to the one or more embodiments, the infrared ray stop signal generating circuit 18 includes the first electronic circuit (the NPN transistor 88, the resistors R41, R42) that responds to the abnormal signal from the low-beam abnormality detecting circuit 14 (the first abnormal signal) to output the first infrared ray stop signal, and the second electronic circuit (the NPN transistor 90, the resistors R43, R44) that responds to the abnormal signal from the power-supply abnormality detecting circuit 16 (the second abnormal signal) to output the second infrared ray stop signal, and respective outputs of the first and second electronic circuits are connected to the control circuit 30 as one added intermediate voltage signal line 36. As a result the first infrared ray stop signal and the second infrared ray stop signal can be transmitted by two sets of simple electronic circuits and one intermediate voltage signal line 36, and a simplification of the circuit configuration can be attained.

Also, according to the one or more embodiments, the lower beam lighting circuit 26, the low-beam abnormality detecting circuit 14, and the power-supply abnormality detecting circuit 16 are constructed integrally and are mounted on the driver module 28. As a result, it is not needed that additional circuit units should be provided to brighten the lower beam or to detect the abnormality of the power supply or the lower beam, and thus assembling of the vehicle headlight device can be facilitated.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

DESCRIPTION OF REFERENCE NUMERALS 10 vehicle headlight device
12 lower beam unit
14 low-beam abnormality detecting circuit
16 power-supply abnormality detecting circuit
18 infrared ray stop signal generating circuit
20 control unit 22 upper beam/infrared ray switching unit
24 low-beam light source block
26 lower beam lighting circuit
30 control circuit
32 upper beam/infrared ray light source unit
34 infrared ray transmission filter driving circuit

What is claimed is:

1. A vehicle headlight device comprising:
a lower beam unit for illuminating a lower beam, an upper beam/infrared ray switching unit for switching between illuminating an upper beam and an infrared ray, a control circuit that receives power from a power supply, and controls the switching of the upper beam/infrared ray switching unit;
a low-beam abnormality detecting circuit for detecting an abnormality of the lower beam unit and outputting an abnormal signal upon detection of abnormality;
a power-supply abnormality detecting circuit for detecting an abnormality of the power supply and outputting an abnormal signal upon detection of abnormality; and
an infrared ray stop signal generating circuit for outputting an infrared ray stop signal to the control circuit based on the abnormal signal from the low-beam abnormality detecting circuit or the abnormal signal from the power-supply abnormality detecting circuit;
wherein the control circuit inhibits the upper beam/infrared ray switching unit from illuminating the infrared ray in response to receiving the infrared ray stop signal from the infrared ray stop signal generating circuit, and commands the upper beam/infrared ray switching unit to illuminate the upper beam or the infrared ray when the infrared ray stop signal is not received from the infrared ray stop signal generating circuit.

2. The vehicle headlight device according to claim 1, wherein the infrared ray stop signal generating circuit comprising two sets of electronic circuits each of which comprises a transistor and a plurality of resistors, wherein outputs of both electronic circuits are connected to the control circuit as one added signal line, wherein one electronic circuit outputs a first infrared ray stop signal in response to an abnormal signal from the low-beam abnormality detecting circuit, and wherein other electronic circuit outputs a second infrared ray stop signal in response to an abnormal signal from the power-supply abnormality detecting circuit.

3. The vehicle headlight device according to claim 2, wherein the lower beam unit comprises:
a light emitting diode for emitting the lower beam; and
a lower beam lighting circuit for lighting the light emitting diode, and wherein the lower beam lighting circuit, the low-beam abnormality detecting circuit, and the power-supply abnormality detecting circuit are constructed integrally.

4. The vehicle headlight device according to claim 1, wherein the lower beam unit comprises:
a light emitting diode for emitting the lower beam; and
a lower beam lighting circuit for lighting the light emitting diode, and wherein the lower beam lighting circuit, the low-beam abnormality detecting circuit, and the power-supply abnormality detecting circuit are constructed integrally.

5. The vehicle headlight device according to claim 1, wherein the upper beam/infrared ray switching unit comprises:
a light source that emits light; and
an infrared ray transmission filter movable into and out of a transmission path of the light emitted from the light source, wherein the switching between illuminating the upper beam and the infrared ray is based on the movement of the infrared ray transmission filter.

6. A vehicle headlight device comprising:
a lower beam unit for illuminating a lower beam;
an upper beam/infrared ray switching unit for switching between illuminating an upper beam and an infrared ray;
a low-beam abnormality detecting circuit for detecting an abnormality of the lower beam unit;
a power-supply abnormality detecting circuit for detecting an abnormality of a power supply of the vehicle headlight;
a control circuit that inhibits the upper beam/infrared ray switching unit from illuminating the infrared ray when an abnormality is detected by either the low-beam abnormality detecting circuit or the power-supply abnormality detecting circuit; and
an infrared ray stop signal generating circuit for outputting an infrared ray stop signal to the control circuit based on the detection of an abnormality by either the low-beam abnormality detecting circuit or the power-supply abnormality detecting circuit, wherein the control circuit inhibits the upper beam/infrared ray switching unit from illuminating the infrared ray when the infrared ray stop signal is received.

7. The vehicle headlight device according to claim 6, wherein the infrared ray stop signal generating circuit comprises:
a first electronic circuit that outputs a first infrared ray stop signal when an abnormality is detected by the low-beam abnormality detecting circuit; and
a second electronic circuit that outputs a second infrared ray stop signal when an abnormality is detected by the power-supply abnormality detecting circuit, wherein outputs of the first electronic circuit and second electronic circuit are connected to the control circuit as one added signal line.

8. The vehicle headlight device according to claim 7, wherein the first electronic circuit and the second electronic circuit each comprise a transistor and a plurality of resistors.

* * * * *

UNITED STATES PATENT AND TRADEMARK OFFICE
CERTIFICATE OF CORRECTION

PATENT NO. : 7,999,478 B2  
APPLICATION NO. : 12/105135  
DATED : August 16, 2011  
INVENTOR(S) : Yasushi Noyori et al.

Page 1 of 1

It is certified that error appears in the above-identified patent and that said Letters Patent is hereby corrected as shown below:

Title page, Item (73) Assignee:, the Assignee "Koita Manufacturing Co., Ltd." should read
-- Koito Manufacturing Co., Ltd. --

Signed and Sealed this
Thirteenth Day of December, 2011

David J. Kappos
*Director of the United States Patent and Trademark Office*